G. T. STRITE.
PLOW.
APPLICATION FILED AUG. 29, 1917.
1,303,518.
Patented May 13, 1919.
4 SHEETS—SHEET 2.
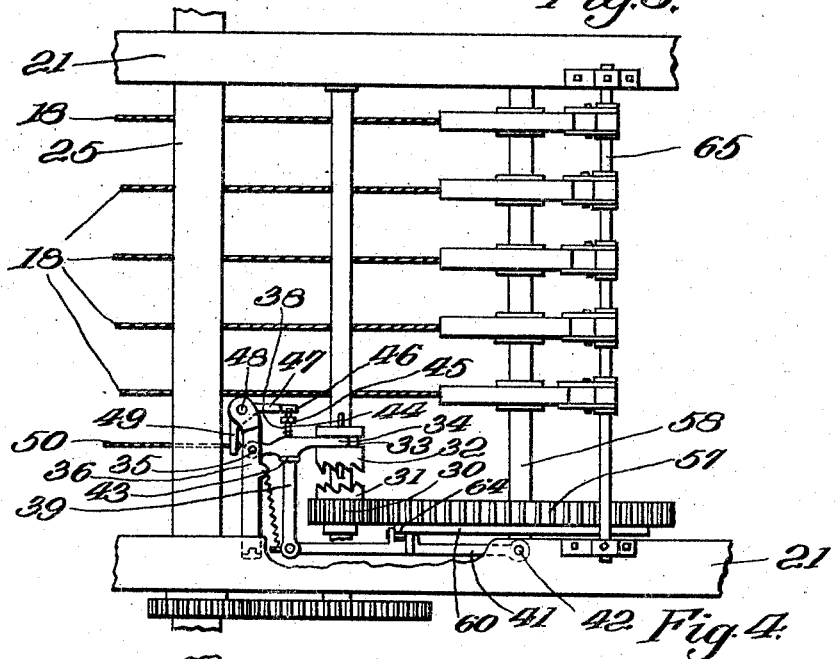
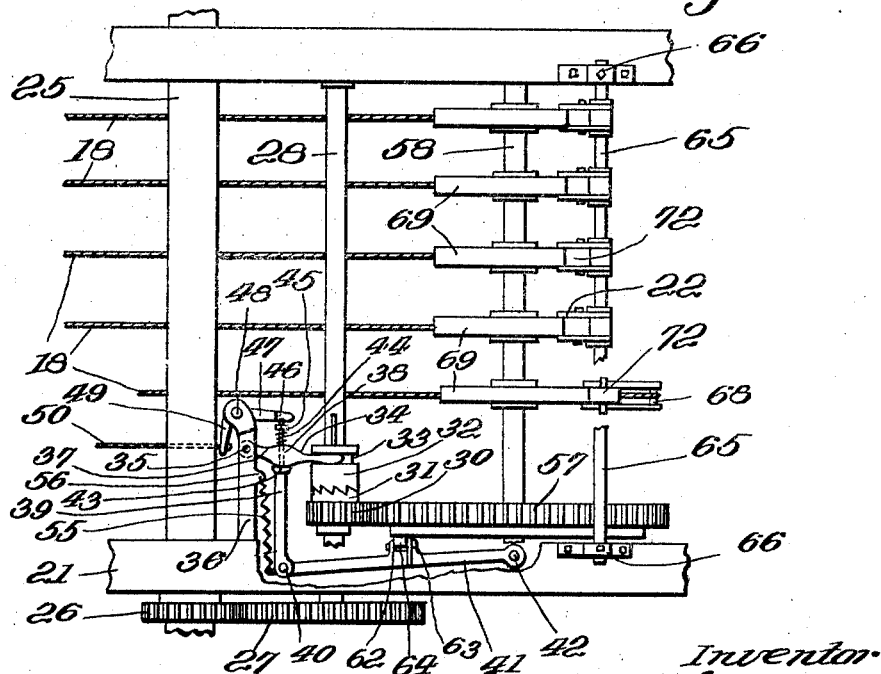
Inventor
George T. Strite
by H. F. Bein
Attorney.

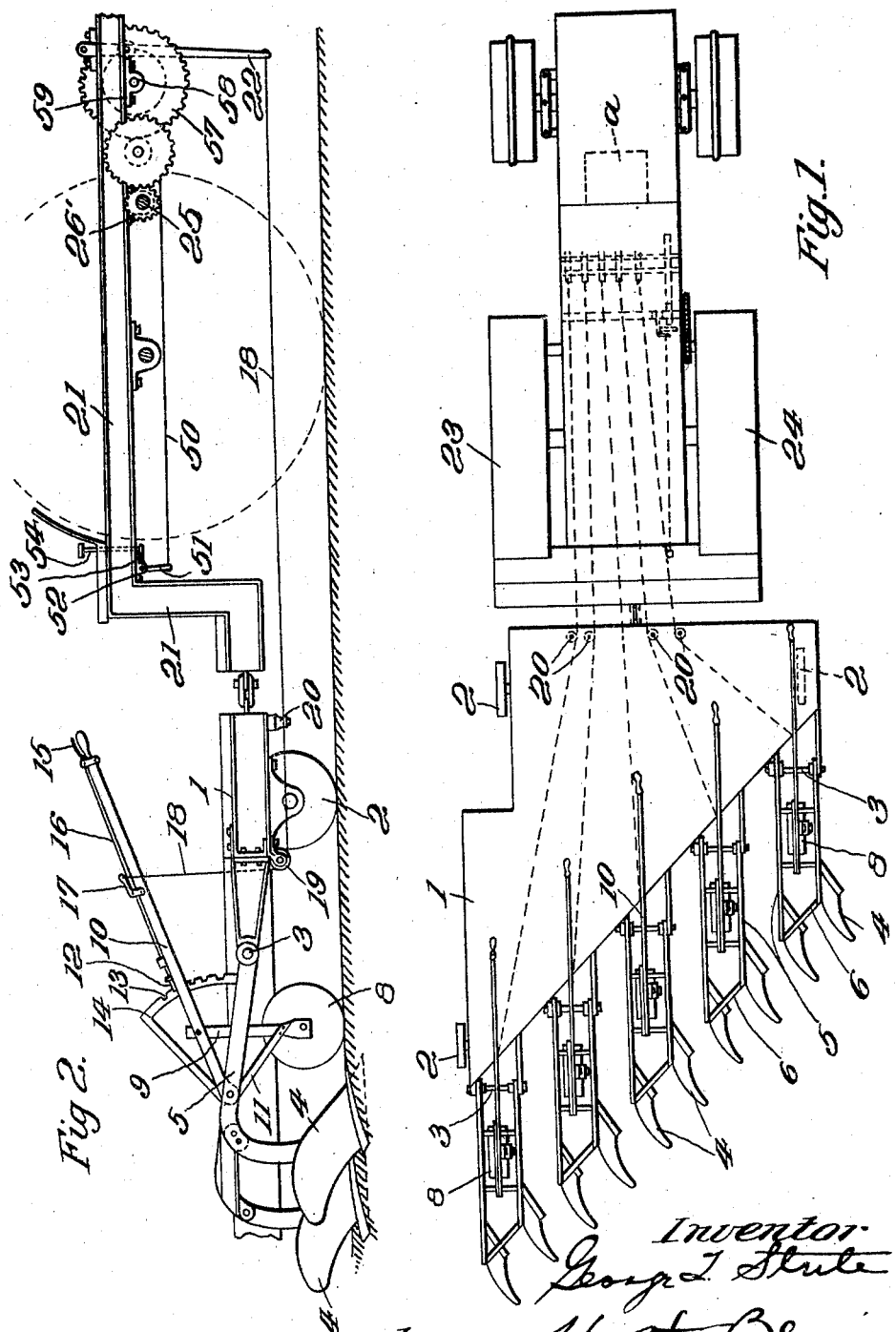

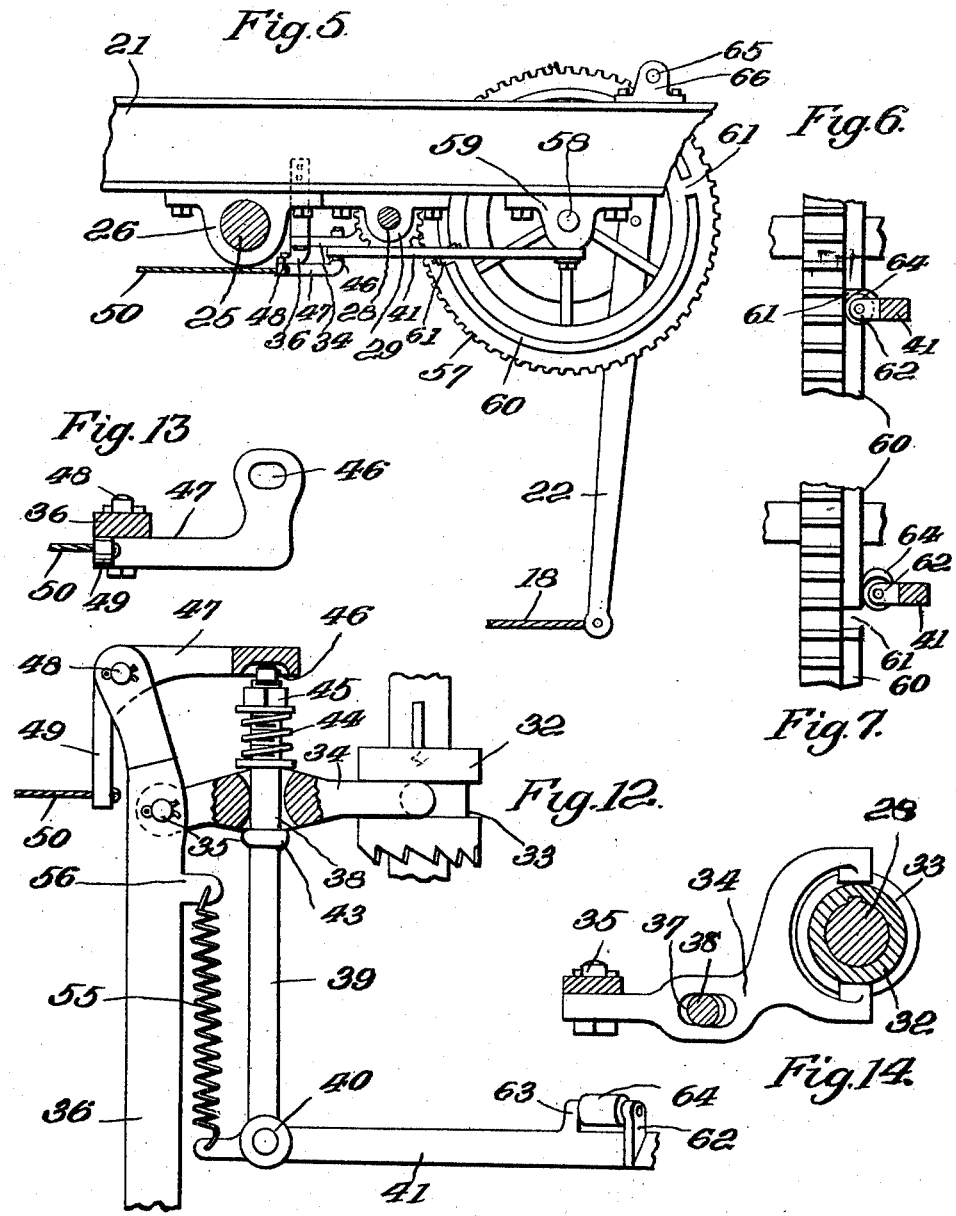

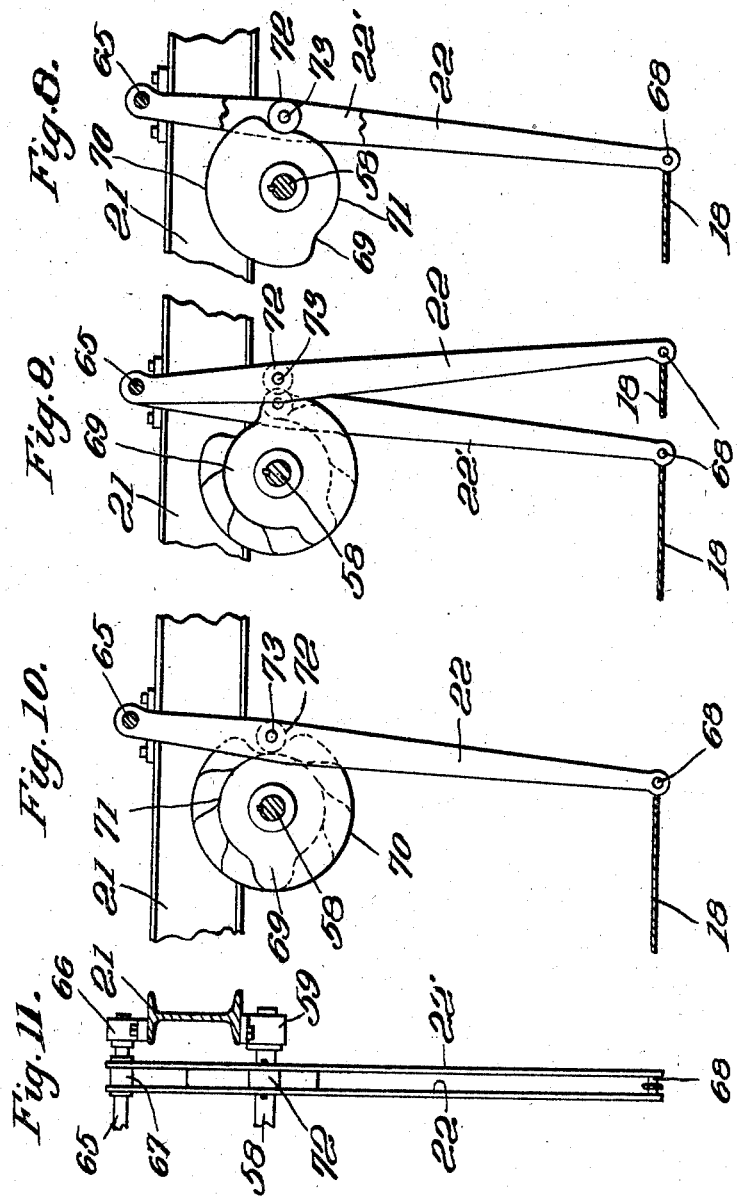

UNITED STATES PATENT OFFICE.

GEORGE T. STRITE, OF MINNEAPOLIS, MINNESOTA, ASSIGNOR TO AVERY COMPANY, OF PEORIA, ILLINOIS, A CORPORATION OF ILLINOIS.

PLOW.

1,303,518.  Specification of Letters Patent.  Patented May 13, 1919.

Original application filed February 20, 1911, Serial No. 609,628. Divided and this application filed August 29, 1917. Serial No. 188,803.

*To all whom it may concern:*

Be it known that I, GEORGE T. STRITE, a citizen of the United States, residing at Minneapolis, in the county of Hennepin and State of Minnesota, have invented certain new and useful Improvements in Plows, of which the following is a specification, reference being had therein to the accompanying drawing.

My invention relates to an automatic power operated plow lift and is especially adapted to application in connection with motor drawn gang plows employing a large number of individual plows. In such cases it is necessary that each plow occupy a position to the rear of the adjacent plow on the share side thereof in order that sufficient room may be allowed each plow for the turning of the furrow. If all of the plows in such a gang are simultaneously lifted or thrown from the ground there will be a triangular piece of ground left unplowed. It is desirable, therefore, to lift the plows successively and automatically so that all of the furrows will be ended of comparatively the same length and the margins of the plowed land thereby left in an even condition.

In connection with the above it is provided that the individual lifting of any plow may also be effected at will at any desired intermediate time, the construction being such that this individual plow lift is not obstructed by the power gang lift and also permits their operation as aforesaid.

The invention relates particularly to gang plowing mechanisms of the class in which each comprises an engine or tractor and a draft frame detachably connected to it and trailing behind it, this frame being so mounted and supported in relation to the ground surface that the plow-beam-attaching points will be held in substantially fixed positions in relation to the ground surface when the apparatus is at work. Each plow unit is secured to the draft frame in such way that the important parts of the unit, such as the body and the beam, will be so held at all times that they can vibrate vertically in arcs which are fixed in relation to the connecting points on the frame. The plowing mechanisms of the class referred to are in contradistinction to those of the class in which there were several points of flexible union between the beam and the frame; there always being an overhanging support connected to the unit at a point near the plow body, and intended to lift or lower the body, and there generally being also a link system interposed between the front end of the beam proper and the draft frame, the link or links being connected to the front end of the beams by one set of pivot devices, and the front end of the link or links being connected by another set of pivot devices, the front end of the beam proper being allowed to move vertically bodily in relation to the frame and sometimes to move laterally. In a plow of the sort to which the present invention relates, the plow unit comprises a beam which, when at work, is rigid in relation to the plow body, and is secured to the draft frame by a device furnishing a single pivot abutment around which the beam and the body swing vertically, as aforesaid, in fixed arcs, and the supporting of the body at any one of its several working lines (optionally predetermined) and its lifting vertically to points above the ground are accomplished by means of a wheel connected to the beam and located relatively near the body whereby it is adapted to take the down pressure from the suction of the body when at work and from its gravity when it is elevated for transportation.

One of the objects of the present invention is to provide an improved mechanism whereby the several plow units of the class above referred to can be lifted upon the ground wheels in succession by means of an automatically acting power mechanism. Plows of the class to which my invention relates have usually been constructed prior to my invention with long forward extending hand levers connected with the supporting wheels and adapted to be operated by a plowman on the main frame platform to raise or lower the plows. And locks were provided for holding the plows either in elevated position or in any of several working positions.

The hand levers have many features of advantage which are not present in an automatically acting successive lift power mechanism. It sometimes happens that it is desirable to operate the plow with one or more of the units raised to inoperative positions, and it also sometimes happens that one of the units must be raised temporarily independently of the others to pass over an obstruction. Another object of my invention is to provide in combination two sets of lifting devices for the plow units, one of these sets being hand levers manually controllable from the platform, and the other set being power actuated devices operating automatically in succession.

In the drawings which represent the application of my invention in one form,—

Figure 1 is a plan of gang plow and traction engine diagrammatically represented and showing my improvements connected therewith.

Fig. 2 is a side elevation of a portion of such machines showing the manner of connection of the lifting levers to the plow levers.

Figs. 3 and 4 are fragmentary plan views of the frame and of the engine showing my invention applied thereto.

Fig. 5 is a side elevation partly in section of the same parts.

Figs. 6 and 7 are detail views of the clutch operating device shown in Fig. 5.

Figs. 8, 9 and 10 are side views of the hoisting cams and levers in different positions.

Fig. 11 is an end view of one of the same.

Fig. 12 is an enlarged detail view of the clutch operating mechanism.

Figs. 13 and 14 show details of the same parts.

In the drawings 1 represents the framework and platform of the gang plow traveling upon wheels 2, to which framework are pivotally attached, by means of rock shafts 3, plows 4 the beams 5 of which may be secured together in pairs by yoke members 6, as shown. Each plow or pair of plows so yoked together, has mounted thereon a roller or wheel 8 for holding the plows in position to enter the ground to the desired depth or so that said plows may be withdrawn from and held out of contact with the ground. The rollers 8 are held in yokes 9 secured to levers 10 and angular arms 11 fast on said levers 10, the levers 10 being pivoted to the plow beams and therefore operating to raise or lower the rollers 8 with respect to the bottom of the plow-share which, by reason of the contact of the rollers 8 with the ground, will have the effect of lowering and raising the plow itself. The levers 10 are held in any desired position by means of ratchets 12 coöperating with notches 13 in segments 14, said ratchets being operable by a hand piece 15 connected thereto by a link or cord 16. Or the ratchets may be operated by the power lift by means of a similar member 17 in connection with said link 16, which members 17 may be operated by flexible connections 18 extending around pulleys 19 and 20 or equivalent bearings or abutments on the draft frame, where the same are desirable, beneath the platform 1 of the plow frame and beneath the frame 21 of the traction engine, to lifting levers 22 mounted to oscillate on said frame, as will be hereinafter described.

By this or equivalent mechanism the power lift can pick up and thereafter control any plow which has been individually adjusted for a temporary purpose.

The said frame 21 is carried by traction wheels 23 and 24 which are rotated by a power shaft 25 in a well-known manner, the power shaft being driven by a prime mover $a$ of common construction (Fig. 1). Said power shaft is carried by bearings 26' attached to the traction frame 21 and has fast thereon a gear 26 meshing with a larger gear 27 on a clutch shaft 28 carried in bearings 29 secured to the frame 21. Loose on the clutch shaft 28 is a gear 30 having thereon a clutch face splined and adapted to slide on the shaft 28. The clutch 32 has a groove 33 with which coöperates a fork 34 pivoted at 35 to an arm 36 secured to the frame 21, said fork having an opening 37 through the shank thereof, which opening embraces a diminished portion 38 of a link 39 pivotally connected at 40 to an arm 41 pivoted at 42 to the frame 21. The clutch fork 34 is normally pressed against a shoulder 43 on the arm 39 by a spring 44 extending between said clutch arm and a nut or shoulder 45 on the diminished portion 38. This arrangement permits the clutch faces to come apart when from any cause the operative portions of the machine, while geared to my power lifting device, engage obstructions which make it desirable for said power lifting device to become unclutched to avoid breakage, the spring 44 being of such strength as normally to hold the clutch faces in engagement when driving action of the lifting devices is desired. The clutch teeth are formed slightly oblique in their operative surfaces with respect to the forward or actuating direction of rotation of the shaft, the arrangement being such that, unless abnormal conditions occur, the parts will be clutched to rotate the cam shaft, but may give when an unexpected obstruction is met with during lifting action. Movement of the clutch fork 34 is effected simultaneously with the movement of the arm 41 to throw the clutch 32 into engagement with the clutch face 31 through the link 39, the free end of which is engaged by a socket 46 on one arm 47 of a bell crank pivoted at 48 to the bracket 36. The other arm 49 of said bell crank is connected by a link 50 to a depending arm 51 of a bell crank pivoted at 52 to the frame 21 below the rear platform of the traction engine, the other arm 53 of said bell crank being pivotally connected to a foot lever 54 extending above said platform. By depressing the foot lever 54 the arms 51 and 49 will be simultaneously rocked so as to cause the arm 47 to be rocked against the force of a spring 55 extending between the arm 41 and a lug 56 on the bracket 36 depending from the frame 21. This will rock the arm 47 in a direction to thrust the link 39 outwardly, thereby swinging the arm 41 outwardly and at the same time, through the spring 44 rocking the clutch fork 24 to move the clutch 32 into engagement with the clutch face 31. The gear 30 is in mesh with a gear 57 fast on a cam shaft 58 carried by bearings 59 attached to the frame 21. Outstanding from the side of the gear 57 is an annular ring 60, said ring being divided at diametrically opposite direction thereto by notches 61, as shown in Fig. 5. The arm 41 is provided with inwardly extending short arms 62 and 63, between which is mounted a roller 64 of the proper size to enter the notch 61. When the link 39 is actuated to throw into gearing the clutch 32 the arm 41 is simultaneously rocked to withdraw the roller 64 from the notch 61. The gear 57 will thereupon immediately begin to revolve, which will cause the roller 64 to ride upon the annular ring 60 with the result that the arm 41 and clutch fork 34 will be positively held in operative position, without regard to whether the operator continues to hold down the foot lever 54, until said roller comes over the other notch 61 one hundred and eighty degrees (180°) from the first notch, whereupon said roller will be thrust into said notch by action of the spring 55, the clutch be simultaneously thrown out of gear, and rotation of the gear 57 will be instantly stopped.

The levers 22 depend from a shaft 65 rigidly secured to the frame 21 by pieces 66 so as to extend across said frame in proximity to the shaft 58, the levers 22 being mounted on said shaft 65 so as to be capable of independent rocking movement thereon. Each of said levers is composed of two pieces 22 and 22′ held properly spaced apart on the shaft 65 by washers 67 and secured together in parallel relation by a bolt or other connection 68 at the free ends thereof, which also serves as means for securing the cords 18 to said levers. Upon the shaft 58 are a series of cams 69, each of said cams being placed in operative relation to one of the levers 22 and comprising a disk of the proper thickness to enter between the bars 22 and 22′ of said levers, said disk having a semi-circular high portion 70 and a semi-circular lower portion 71, each of said portions being concentric with respect to the other and extending throughout approximately one-half of the peripheral circumference of the disk. Each cam is or may be thus formed with a continuous surface comprising a low or inactive portion, an active lifting portion extending from the low to the high portion, a high or plow-sustaining portion and an inclined non-radial plow-lowering portion extending gradually back to said low portion, all of these portions continuously and successively coöperating with levers 22 to effect the lifting and lowering of the plow. Each cam disk 69 engages a roller 72 mounted on a pin 73 extending between the bars 22 and 22′, the rollers being held against the cam faces by the weight of the plows operating to draw the levers 22 rearwardly by means of the connecting cords 18, and when said rollers are on the lower cam face 71 the plows will be held operative so as to be free to enter the ground, from which they will be lifted when said rollers pass up from the low cam-faces 71 to the high cam-faces 70 which serve as stops for sustaining the plow bodies on the power mechanism. The cams are differentially placed on the shaft 50, as clearly shown in Figs. 9 and 10, in such manner that the rollers 72 will be successively lifted. That is, the lifting portions of the cams are successively positioned and so proportioned that they exercise a lifting action during but an extremely brief period of their rotation, and each acts to completely lift its plow before the next begins to lift. The plows are lifted immediately and nearly vertically notwithstanding the forward movement of the apparatus, and each plow has completed its elevating movement and remains stationary while the other plows are being raised or lowered, no two plows being in movement at the same time. This arrangement, and the gearing by which the cam-shaft 58 is rotated, are such that a half revolution of the cam-shaft will effect the successive operation of the levers 22 through the rollers 72 thereby successively lifting the plows, and lifting each plow, or pair of plows in a line transversely even with one another. That is, the annular spacing of the cams around the shaft 58 and the rate of rotation of said shaft in relation to the speed of travel of the machine are so related that the plows come out of the ground and enter it successively along a straight line transverse to the line of draft of the machine. It will be noted that this will be so whatever the rate at which the gang of plows is being drawn by the traction engine, since the shaft 25 which operates the plow-lifting devices is the driving shaft of the traction wheels. Conversely, a full half revolution of the cam-shaft will successively restore the plows to operative position so that the same will enter the ground to begin a new set of furrows on a similar transversely even line.

The operation of my device will readily be understood in connection with the detailed description thereof. At the beginning of plow operations it will be necessary for the operator merely to depress the foot lever 54 long enough to start operation of the cam-shaft when the roller 64 will engage the annular ring 60, thus clutching the cam-shaft until the same has completed the necessary half revolution to place all of the plows into the ground. At the end of the furrow a similar short pressure on the foot lever will similarly operate the device for automatically and positively holding the cam-shaft in gear for a sufficient length of time to effect the half revolution and withdraw the plows successively from the ground. At the same time each plow or pair of plows connected to the hand levers 10 can be independently operated.

It will be seen that with a plowing mechanism embodying my invention the operator is provided with two complete sets of devices whereby he can control the plows. Usually during normal plowing operation the plows are raised or lowered by means of the power actuated mechanism. But if this mechanism is not available at any time, as for instance, when the whole apparatus is standing still then the plowing units, or any of them, can be lifted manually at will by means of the hand levers. During plowing the plow bodies are firmly locked against movement with respect to their ground wheels, but as soon as power is applied for lifting the body the locks are automatically released. The lifting mechanism is so disposed with respect to the top surface of the platform that the said surface is left entirely free from obstruction so that the plowman can walk about on it to operate the levers.

It will be clear that plowing mechanisms embodying my invention may be constructed by adding parts to plows already built and not originally intended to be power controlled as to their lifting.

In the construction illustrated the segments 14, in connection with the levers 10, form stops to hold the wheel 8 downward relative to an individually lifted plow to hold the latter up as long as desired; and also form stops to hold the plows from further downward movement relative to the wheels 8 when the plows are in active position, and thereby regulate the depth of plowing.

This application is a division of my application Serial Number 609,628, filed Feb. 20, 1911.

What is claimed is:

1. In a gang plow, the combination of a ground supported draft frame adapted to be hitched behind a tractor, a series of independently rising and falling plow bodies each hinged directly to the draft frame for vertical movement in fixed arcs, a series of vertically movable body supporting wheels each connected to and supporting one of the plow bodies, a power device having an abutment on the main frame and connected with all of the said ground wheels to move them vertically and automatically successively, a holder for securing each ground wheel in fixed operative relation to its plow body having two reciprocally engaging separable parts one connected to the body and the other to the wheel, means actuated by the power device for separating the parts of said holders successively to permit the power device to lift the bodies successively, and optionally controlled devices manually operable from the draft frame for separating the parts of any holder to permit the corresponding body to be vertically moved and for then lifting such body independently of the others, said power devices and manual devices being adapted to independently separate the parts of the holders, respectively.

2. In a gang plow, the combination of a ground supporting draft frame adapted to be hitched behind a tractor, a series of independently rising and falling plow bodies each hinged to the draft frame for vertical movement in fixed arcs, a series of vertically movable body supporting wheels, each connected to one of the plow bodies, a series of independent hand levers each connected with one of the body-supporting wheels, a power device having an abutment on the draft frame and connected with all of the said body-supporting wheels to move them successively vertically throughout the series relative to the said abutment, a lock adapted to secure each ground wheel in fixed relation to its plow body, and means actuated by the power devices for releasing the locks and then moving vertically the corresponding bodies.

3. In a gang plow, the combination of a ground supporting draft frame, adapted to be hitched behind a tractor, a series of independently rising and falling plow bodies, each hinged to the draft frame for vertical movement in fixed arcs, a series of vertically movable body-supporting wheels each connected with one of the bodies and adapted to adjust the relative position of its body independently of the others, a lock for adjustably securing each wheel in adjusted position, and a power device connected to all of the locks and to all of the said body-supporting wheels to move them successively vertically from one end of the series to the other after releasing the locks successively.

4. In a gang plow, the combination of a ground supporting draft frame adapted to be hitched behind a tractor, a series of independently rising and falling plow bodies each hinged to the draft frame for vertical movement in fixed arcs, a series of vertically movable body-supporting wheels each connected to one of the plow bodies, a series of independent hand levers each connected with one of the body supporting wheels, a power device having its abutment on the draft frame and connected with all of the said ground wheels to move them respectively vertically automatically in succession throughout the series, a lock adapted to secure each ground wheel in fixed relation to its plow body, and means operated by the power devices for releasing the lock automatically, prior to moving the said wheels vertically.

5. In a gang plow, the combination of a ground supporting draft frame, adapted to be hitched behind a tractor, a series of independently rising and falling plow bodies, each hinged to the draft frame for vertical movement in fixed arcs, a series of body-supporting wheels each connected to one of the plow bodies and movable vertically independently thereof, a series of independent hand levers each connected with one of the body supporting wheels, a power device connected with all of the said ground wheels to move them automatically in succession vertically throughout the series at each actuation of the power device, a lock for each ground wheel adapted to secure it in fixed relation to the plow body, and means actuated by the power devices for releasing the locks automatically successively.

6. In a gang plow, the combination of a ground supporting draft frame adapted to be hitched behind a tractor, a series of independently rising and falling plow bodies each hinged directly to the draft frame for vertical movement in fixed arcs, a series of vertically movable body-supporting wheels each adjustably connected to one of the plow bodies, power devices connected to all of the said plow bodies for elevating them automatically in succession from one end of the series to the other at each actuation of the power mechanism, a series of hand levers connected to each of the said body-supporting wheels and adapted to raise and lower the plow bodies independently of the power mechanism and of each other and to set the bodies at different adjustments relative to the said wheels, and means for adjustably fastening the levers independently of each other in relation to the plow bodies, said power devices being adapted to automatically lift the bodies from their several varying positions of vertical adjustment.

7. In a gang plow, the combination of a ground supported draft frame adapted to be hitched behind a tractor, a series of independently rising and falling plow bodies each hinged to the draft frame for vertical movement in fixed arcs, a series of vertically movable body-supporting wheels each connected to one of the plow bodies, two systems of devices for moving the said ground wheel independently relatively to their bodies, the first system being a series of independent hand levers connected to the said wheels, and a series of adjustable locks each fastening a lever and its wheel in different positions relative to their plow body, and the second system comprising a power mechanism connected to all of the said plow bodies in common, for lifting them successively at each actuation, and means actuated by the power mechanism for releasing the said locks, said power mechanism being adapted to lift the said bodies from their differing vertical positions to higher positions after opening the locks.

8. In a gang plow, the combination of a ground supported draft frame adapted to be hitched behind a tractor, a series of independently rising and falling plow bodies each hinged to the draft frame for vertical movement in fixed arcs, a series of vertically movable body-supporting wheels each connected to one of the plow bodies, two systems of devices for moving the said wheels vertically relative to their bodies, the first system being a series of independent hand levers connected to the said wheels and an adjustable lock for fastening each lever and its wheel in different positions relatively to their plow body, and the second system comprising power mechanism connected to all of the said plow bodies in common for lifting them automatically in succession at each actuation, and stops independent of the said lock mechanism for sustaining the plow bodies on the power mechanism.

9. In a gang plow, the combination of a ground supported draft frame adapted to be hitched behind a tractor, said frame having an unobstructed platform surface for an operator, a series of independently rising and falling plow bodies, each hinged directly to the draft frame for vertical movement in fixed arcs, a series of vertically adjustable plow supporting wheels, each connected to one of the plow bodies, a power mechanism supported independently of the said upper surface of the platform, and connected with all of the said plow bodies for elevating them automatically in succession from one end of the series to the other at each actuation of the power mechanism, and a series of hand levers connected to each of said ground wheels and accessible to an operator on the said platform for adjusting the said ground wheels independently of the power mechanism and of each other.

10. In a power operated plow lift, in combination: a frame; a series of individual plow units pivoted to the frame, each plow unit having a beam, a plow bottom and a vertically adjustable wheel; a wheel-adjusting mechanism for each unit comprising a hand lever for adjusting the wheel independently of the other plow units; a wheel stop to hold the wheel and hand lever in predetermined position; and a series of power-actuated plow-lifting devices arranged to automatically operate in succession and each connected with a wheel-adjusting mechanism and adapted to successively move the stops that hold the hand levers and the wheels and successively lift and lower gradually the plow bottoms on the wheels.

11. In a power operated gang plow lift, the combination of a draft frame, a gang of plows, each plow having a connected and relatively depressible supporting wheel, power operated mechanism for relatively depressing said wheels automatically in predetermined succession and thereby correspondingly lifting all of the plows, and individual wheel controlling and plow lifting and supporting means operable manually from the draft frame for raising and positively holding up any plow separately, said power mechanism remaining operative for automatic successive lifting irrespective of such holding up of any plow.

12. In a power operated gang plow lift, the combination of a gang of plows, each plow having a connected and relatively depressible supporting wheel, power operated means for relatively depressing said wheels in automatically predetermined succession and thereby correspondingly lifting said plows successively as a gang, stops for holding the said wheels depressed and the plows elevated together, independent individual plow lifting means for depressing a wheel and lifting its plow separately from the other wheels and plows, and stops for said individual plow lifting means for holding depressed any wheel when its plow is elevated.

13. In a power operated gang plow lift, the combination of a gang of plows, each plow having a connected and relatively depressible supporting wheel, power operated means for relatively depressing said wheels in automatically predetermined succession and thereby correspondingly lifting said plows successively as a gang, stops for holding the said wheels depressed and the plows elevated together, independent individual plow lifting means for depressing a wheel and lifting its plow separately from the other wheels and plows, and stops for said individual plow lifting means for holding depressed any wheel when its plow is elevated, the elements of the last mentioned stops being separable by said power operated means.

In testimony whereof, I affix my signature in presence of two witnesses.

GEORGE T. STRITE.

Witnesses:
MARGARET E. GOULD,
EDITH YAUKE.

Copies of this patent may be obtained for five cents each, by addressing the "Commissioner of Patents, Washington, D. C."